United States Patent Office 3,488,364
Patented Jan. 6, 1970

3,488,364
13-POLYCARBON ALKYL-18,19-DINORPREGN-4-EN-3-ONES
Daniel M. Teller, King of Prussia, George H. Douglas, Paoli, and Herchel Smith, Wayne, Pa., assignors to American Home Products Corporation, New York, N.Y., a corporation of Delaware
No Drawing. Filed Apr. 4, 1967, Ser. No. 628,275
Int. Cl. C07c 169/50; A61k 27/00
U.S. Cl. 260—397.4
3 Claims

ABSTRACT OF THE DISCLOSURE

The compounds of the class of 13-polycarbon alkyl-18,19-dinorpregn-4-en-3-ones useful as androgen antagonists and progestational agents.

BACKGROUND OF THE INVENTION

This invention relates to the field of new physiologically active 13 - polycarbon alkyl - 17,20 - dihydroxy-18,19-dinorpregn-4-en-3-one and 13-polycarbon alkyl-17-hydroxy 18,19 - dinorpregn-4-en-3,20-dione compounds, novel processes for their production and new intermediates useful in the preparation thereof.

The prior art compounds, 17,20-dihydroxypregn-4-en-3-one, described by P. N. Rao et al in J. Org. Chem. 26, p. 2552 (1961) and A. L. Nussbaum et al in J. Org. Chem. 27, p. 20 (1962) have not been shown to possess anti-androgenic activity.

SUMMARY OF THE INVENTION

More particularly, this invention relates to 19-nor-compounds of the Formula I:

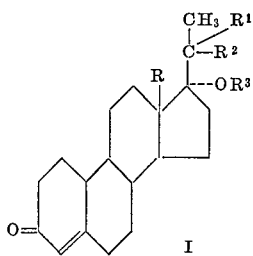

wherein R is an alkyl group having from 2 to 8 carbon atoms; $R^1$ is hydrogen; $R^2$ is hydroxy, or together $R^1$ and $R^2$ is oxo(=O); and $R^3$ is hydrogen or acyl.

Among the suitable acyls may be mentioned the acyl radical of a hydroxycarbon carboxylic acid of less than 12 carbon atoms, as exemplified by the lower alkanoic acids (e.g., acetic, propionic, butyric, hexanoic and enanthic acid), the lower alkenoic acids, the cycloalkane carboxylic acids, the monocyclic aromatic carboxylic acids (e.g., benzoic acid), and the monocyclic aryl lower alkanoic acids (e.g., phenylacetic and β-phenylpropionic acid).

The final products of this invention are physiologically active substances which are useful as progestational agents and androgenic antagonists.

The compounds may be formulated for such administration, the concentration and/or dosage being based on the activity of the particular compound and the requirements of the patient.

DESCRIPTION OF THE PREFERRED EMBODIMENTS

The 19-nor compounds of this invention may be prepared according to the process of the invention which may be represented by the following reaction scheme wherein R, $R^1$, $R^2$ and $R^3$ are as hereinbefore defined:

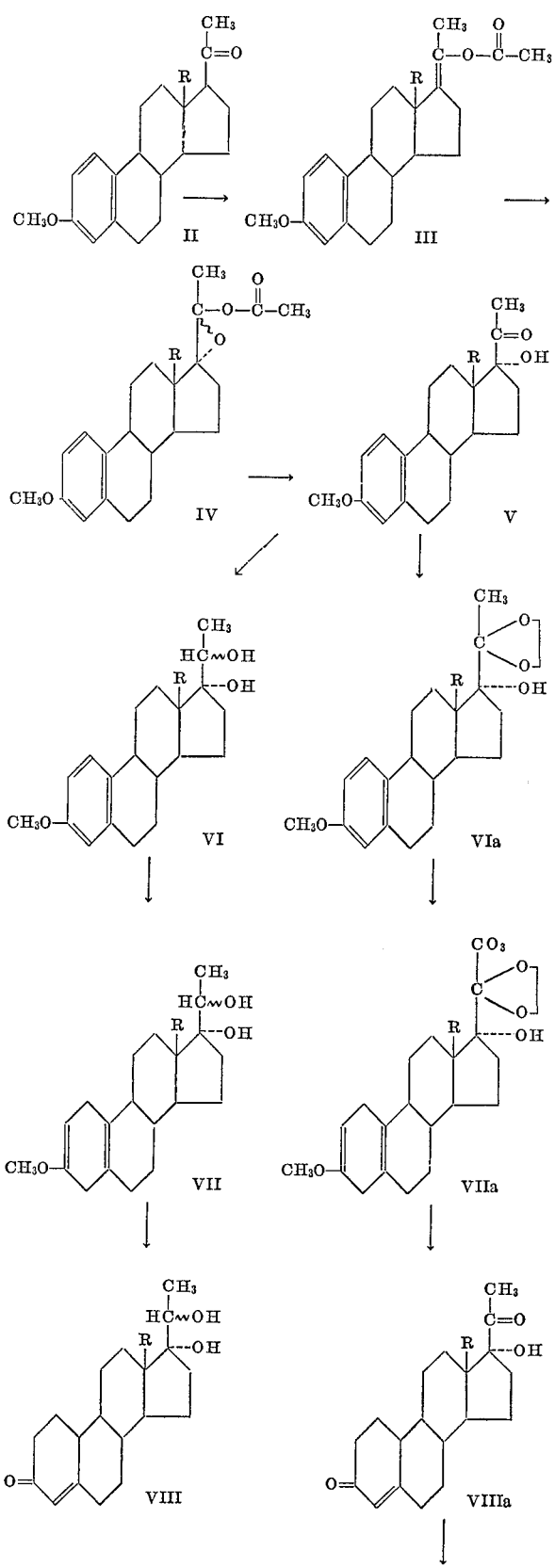

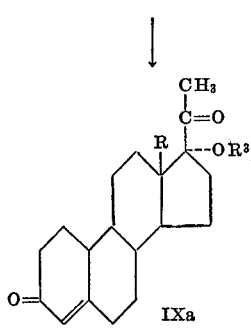

According to a feature of this invention, the 17β-acetyl-13 - polycarbon alkyl - 3 - methoxygona-1,3,5(10)-triene compound (II) is converted by a known process to the corresponding 3 - methoxy-1,3,5(10),17(20)-tetraen-20-acetate (III). Such process consists in reacting the 20-ketone steroids (II) with an acylating agent such as acetic anhydride, in the presence of a strongly acidic catalyst such as p-toluene sulfonic acid, sulfuric acid or perchloric acid.

The compounds of Formula II are known compounds which may be prepared by any conventional method, such as described in copending application, Ser. No. 534,353 of G. A. Hughes et al., filed Mar. 15, 1966.

The 3 - methoxy-1,3,5(10),17(20)-tetraen-20-acetate compounds (III) are then treated with an oxidizing agent, such as m-chloroperbenzoic acid, in an inert organic solvent to yield the novel 1,3,5(10)-trien-20-acetoxy-17α,20-epoxy compounds of Formula IV.

Treatment of the 1,3,5(10)-trien-20-acetoxy-17α,20-epoxy compounds (IV) with a base, such as dilute sodium hydroxide, yields the corresponding 1,3,5(10)-triene-17-hydroxy-20-keto compounds of Formula V.

Reduction of the 1,3,5(10)-triene-17-hydroxy-20-keto compounds of Formula V with sodium borohydride yields the corresponding 1,3,5(10)-triene-17,20-dihydroxy compound of Formula VI which when further reduced in liquid ammonia with lithium yields the corresponding 2,5(10)-diene-17,20-dihydroxy compound of Formula VII.

Treatment of the 2,5(10)-diene-17,20-dihydroxy compounds (VII) with concentrated hydrochloric acid yields the novel 3-keto-4-ene-17,20-dihydroxy compound of Formula I, which are novel final products of this invention.

In accordance with another feature of this invention, the 1,3,5(10)-triene-17-hydroxy-20-keto compounds (V) are reacted with ethylene glycol to yield the corresponding 1,3,5(10) - triene-17-hydroxy-20-cycloethylenedioxy compounds (VIa) which are reduced liquid ammonia with lithium to yield the corresponding 2,5(10)-diene-17-hydroxy-20-cycloethylenedioxy compounds (VIIa).

Treatment of the 2,5(10)-diene-17-hydroxy-20-cycloethylene-dioxy compound (VIIa) with concentrated hydrochloric acid yield the novel 4-ene-17-hydroxy-3,20-diketo compounds (VIIIa), which are additional final products of the invention.

If desired, the 4-ene-17-hydroxy-3,20-diketo compounds may be acylated by any conventional method, such as by treatment with an acid anhydride or an acyl chloride, to form the corresponding 4-ene-17-acyloxy-3,20-diketo compounds (IXa) which are additional final products of this invention.

The following examples illustrate the invention (all temperatures being in centigrade):

EXAMPLE 1

13 - ethyl - 3 - methoxy-18,19-dinorpregna-1,3,5(10),17

A solution of 100 gm. of 17β-acetyl-13-ethyl-3-methoxygona-1,3,5(10)-triene and 0.53 gm. of p-toluenesulfonic acid in 100 ml. of acetic anhydride is slowly distilled through a short Vigreux column at atmospheric pressure over a 4 hour period leaving approximately 30 ml. of brown residue. The residue is cooled in an ice bath, 100 ml. of water is added and the mixture is stirred for 15 minutes. The mixture is then extracted with ether and the ether extracts washed with 10% aqueous sodium hydroxide, saturated aqueous sodium bicarbonate, water, dried over anhydrous magnesium sulfate and the solvent is evaporated in vacuo yields a brown gum. Column chromatography of the gum on 60 gm. of Florisil using 100% hexane as eluant gives, after recrystallization from methanol, 350 mg. of colorless solid which, on recrystallization from methanol, yields 13-ethyl-3-methoxy-18,19-dinorpregna-1,3,5(10),17(20)-tetraen-20-ol, acetate having a melting point of 89–92°;

$\lambda_{max}^{KBr}$ 5.71, 5.88μ (weak); $\lambda_{max}^{EtOH}$ 284 mμ (ε=1,660)

*Analysis.*—Calcd. for $C_{24}H_{32}O_3$: C, 78.22; H, 8.75. Found: C, 78.22; H, 8.63.

EXAMPLE 2

13 - propyl - 3-methoxy-18,19-dinorpregna-1,3,5(10),17(20)-tetraen-20-ol, acetate Following the procedure of Example 1 but substituting 17β-acetyl-13-propyl-3-methoxygona-1,3,5(10)-triene for 17β-acetyl-13-ethyl-3-methoxygona-1,3,5(10)-triene there is obtained 13-propyl-3-methoxy-18,19-dinorpregna-1,3,5(10),17(20)-tetraen-20-ol, acetate.

EXAMPLE 3

13 - butyl - 3 - methoxy-18,19-dinorpregna-1,3,5(10),17(20)-tetraen-20-ol, acetate Following the procedure of Example 1 but substituting 17β-acetyl 1 13-butyl-3-methoxygona-1,3,5(10)-triene for 17β - acetyl - 13 - ethyl - 3 - methoxygona - 1,3,5(10)-triene here is obtained 13-butyl-3-methoxy-18,19-dinorpregna-1,3,5(10),17(20)-tetraen-20-ol, acetate.

EXAMPLE 4

13 - isobutyl - 3-methoxy-18,19-dinorpregna-1,3,5(10),17(20)-tetraen-20-ol, acetate Following the procedure of Example 1, but substituting 17β - acetyl - 13-isobutyl-3-methoxygona-1,3,5(10)-triene for 17β - acetyl-13-ethyl-3-methoxygona-1,3,5(10)-triene there is obtained 13 - isobutyl - 3 - methoxy - 18,19 - dinorpregna-1,3,5(10),17(20)-tetraen-20-ol, acetate.

EXAMPLE 5

20ξ-acetoxy-17α,20ξ-epoxy-13-ethyl-3-methoxy-18,19-dinorpregna-1,3,5(10)-triene

A solution of 0.95 gm. of m-chloroperbenzoic acid in 9.0 ml. of benzene is added to a solution of 1.00 gm. of 13 - ethyl - 3 - methoxy - 18,19 - dinorpregna - 1,3,5(10) tetraen-20-ol, acetate in 9.0 ml. of benzene over 5 minutes at room temperature with stirring. After stirring 20 minutes at room temperature, turbidity appeared and after 3 hours, ether is added and the solution is washed with cold 5% aqueous sodium hydroxide, saturated aqueous sodium bicarbonate, water, dried over anhydrous magnesium sulfate and then the solvent is evaporated in vacuo giving a gum which crystallized on triturating with hexane. Recrystallization from isopropanol yields 0.55 gm. of 20ξ - acetoxy - 17α,20ξ - epoxy - 13 - ethyl - 3 - methoxy - 18,19 - dinorpregna - 1,3,5(10) - triene, M.P. 113–125°;

$\lambda_{max}^{KBr}$ 5.71; $\lambda_{max}^{EtOH}$ 282 (ε 2,190);

*Analysis.*—Calcd. for $C_{24}H_{32}O_4$: C, 74.97; H, 8.39 Found: C, 74.91; H, 8.29.

EXAMPLE 6

20ξ-acetoxy-17α,20ξ-epoxy-13-propyl-3-methoxy-18,19-dinorpregna-1,3,5(10)-trien-20-one Following the procedure of Example 5, but substituting 13-propyl - 3-methoxy - 18,19-dinorpregna-1,3,5(10),17(20)-tetraen - 20-ol, acetate for 13—ethyl - 3-methoxy-18,19-dinorpregna - 1,3,5(10),17(20)-tetraen - 20-ol, acetate there is obtained 20ξ-acetoxy - 17α,20ξ-epoxy-13-propyl - 3-methoxy - 18,19-dinorpregna - 1,3,5(10)-trien-20-one.

EXAMPLE 7

20ξ-acetoxy-17α,20ξ-epoxy-13-butyl-3-methoxy-18,19-dinorpregna-1,3,5(10)-trien-20-one Following the procedure of Example 5, but substituting 13-butyl-3-methoxy-18,19-dinorpregna-1,3,5(10),17(20)-tetran - 20-ol, acetate for 13-ethyl - 3-methoxy-18,19-dinorpregna - 1,3,5(10),17(20)-tetraen - 20-ol, acetate there is obtained 20ξ-acetoxy - 17α,20ξ-epoxy 13-butyl - 3 - methoxy - 18,19-dinorpregna - 1,3,5(10)-trien-20-one.

EXAMPLE 8

20ξ-acetoxy-17α,20ξ-epoxy-13-isobutyl-3-methoxy-18,19-dinorpregna-1,3,5(10)-trien-20-one Following the procedure of Example 5 but substituting 13-isobutyl - 3-methoxy - 18,19-dinorpregna - 1,3,5(10), 17(20)-tetraen - 20-ol, acetate for 13-ethyl - 3-methoxy-18,19-dinorpregna - 1,3,5(10),17(20)-tetraen - 20-ol, acetate there is obtained 20ξ-acetoxy - 17α,20ξ-epoxy 13-isobutyl - 3 - methoxy - 18,19-dinorpregna-1,3,5(10)-trien-20-one.

EXAMPLE 9

13-ethyl-3-methoxy-18,19-dinorpregna-,3,5(10)-trien-17α-ol-20-one

A 0.40 g. quantity of 20ξ-acetoxy - 17α,20ξ-epoxy-13-ethyl - 3-methoxy - 18,19-dinorpregna - 1,3,5(10)-triene is allowed to stand at ambient temperature with 0.48 gm. of sodium hydroxide in a mixture of 60 ml. of ethanol and 20 ml. of water for 3½ hours. The mixture is diluted with ether, washed with saturated aqueous sodium bicarbonate, water, dried over anhydrous magnesium sulfate and the solvent is evaporated in vacuo giving a colorless solid. Recrystallization from absolute ethanol yields 0.26 g. of 13-methyl-3-methoxy-18,19-dinorpregna - 1,3,5(10) - trien - 17α - ol-20-one, M.P. 164–167°, $\lambda_{max.}^{KBr}$ 2.96, 5.92μ; $\lambda_{max.}^{EtOH}$ 281 mμ (ε 2,140)

*Analysis.*—Calcd. for $C_{22}H_{30}O_3$: C, 77.15; H, 8.83. Found: C, 76.91; H, 8.65.

EXAMPLE 10

13-propyl-3-methoxy-18,19-dinorpregna-1,3,5(10)-trien-17α-ol-20-one

Following the procedure of Example 9, but substituting 20ξ - acetoxy - 17α,20ξ - epoxy - 13 - propyl - 3 - methoxy-18,19-dinorpregna - 1,3-5(10) - triene for 20ξ-acetoxy-17α,20ξ-epoxy - 13-ethyl - 3-methoxy - 18,19-dinorpregna-1,3,5(10)-triene there is obtained 13-propyl-3-methoxy-18,19-dinorpregna - 1,3,5(10) - triene for 20ξ - acetoxy-

EXAMPLE 11

13-butyl-3-methoxy-18,19-dinorpregna-1,3,5(10)-trien-17α-ol-20-one

Following the procedure of Example 9, but substituting 20ξ-acetoxy - 17α,20ξ-epoxy - 13-butyl - 3-methoxy-18,19-dinorpregna - 1,3,5(10)-triene for 20ξ-acetoxy-17α,20ξ-epoxy - 13-ethyl-3-methoxy - 18,19-dinorpregna-1,3,5(10)-triene there is obtained 13-butyl - 3-methoxy - 18,19-dinorpregna-1,3,5(10)-trien-17α-ol-20-one.

EXAMPLE 12

13-isobutyl-3-methoxy-18,19-dinorpregna-1,3,5(10)-trien-17α-ol-20-one

Following the procedure of Example 9, but substituting 20ξ-acetoxy - 17α,20ξ-epoxy - 13-isobutyl - 3-methoxy-18,19 - dinorpregna - 1,3,5(10)-triene for 20ξ-acetoxy-17α,20ξ-epoxy - 13-ethyl - 3-methoxy-18,19-dinorpregna-1,3,5(10)-triene there is obtained 13-isobutyl-3-methoxy-18,19-dinorpregna - 1,3,5(10)-trien - 17α-ol-20-one.

EXAMPLE 13

13-ethyl-17α,20-dihydroxy-3-methoxy-18,19-dinorpregna-1,3,5(10)-trien

A solution of 5.40 gm. of 13-ethyl - 3-methoxy-18,19-dinorpregna - 1,3,5(10)-trien - 17α-ol-20-one, 10.0 gm. of sodium borohydride and 500 ml. of absolute ethanol is stirred at room temperature for 14 hours. Excess glacial acetic acid is added, benzene is added and the solution is washed with water, saturated aqueous sodium bicarbonate, water, dried over anhydrous sodium sulfate and the solvent is evaporated in vacuo to yield 7.0 gm. of 13-ethyl - 17α,20-dihydroxy - 3-methoxy-18,19-dinorpregna - 1,3,5(10)-trien.

EXAMPLE 14

13-propyl-17α,20-dihydroxy-3-methoxy-18,19-dinorpregna-1,3,5(10)-trien

Following the procedure of Example 13, but substituting 13-propyl - 3-methoxy - 18,19 - dinorpregna-1,3,5(10)-trien - 17α-ol-20-one for 13-ethyl - 3-methoxy-18,19 - dinorpregna - 1,3,5(10)-trien - 17α-ol-20-one there is obtained 13-propyl-17α,20-dihydroxy-3-methoxy-18,19-dinorpregna - 1,3,5(10)-trien.

EXAMPLE 15

13-butyl-17α,20-dihydroxy-3-methoxy-18,19-dinorpregna-1,3,5(10)-trien

Following the procedure of Example 13, but substituting 13-butyl-3-methoxy-18,19-dinorpregna-1,3,5(10)-trien-17α-ol-20-one for 13-ethyl-3-methoxy-18,19-dinorpregna-1,3,5(10)-trien-17α-ol-20-one there is obtained 13-butyl-17α,20 - dihydroxy - 3 - methoxy-18,19-dinorpregna-1,3,5(10)-trien.

EXAMPLE 16

13-isobutyl-17α,20-dihydroxy-3-methoxy-18,19-dinorpregna-1,3,5(10)-trien

Following the procedure of Example 13, but substituting 13 - isobutyl - 3 - methoxy - 18,19-dinorpregna-1,3,5 (10)-trien-17α-ol-20-one for 13-ethyl-3-methoxy-,18,19-dinorpregna - 1,3,5(10) - trien-17α-ol-2-one there is obtained 13-isobutyl - 17α,20 - dihydroxy-3-methoxy-18,19-dinorpregna-1,3,5(10)-trien.

EXAMPLE 17

13-ethyl-17α,20-dihydroxy-3-methoxy-18,19-dinorpregna-2,5(10)-diene

A solution of 5.4 gm. of 13-ethyl - 17α,20-dihydroxy-3-methoxy - 18,19-dinorpregna - 1,3,5(10)-triene in 100 ml. of distilled tetrahydrofuran is added to 700 ml. of distilled liquid ammonia over 3 minutes giving a suspension. Immediately 5.0 gm. of lithium is added in small pieces as rapidly as possible. The blue mixture is stirred for 2 hours and 150 ml. of absolute ethanol is added over 30 minutes to discharge the blue color. Addition of warm water and the filtering of the resulting precipitate yield 4.45 gm. of 13-ethyl - 17α,20-dihydroxy-3-methoxy - 18,19 - dinorpregna - 2,5(10)-diene, M.P. 135–155°.

EXAMPLE 18

13-propyl-17α,20-dihydroxy-3-methoxy-18,19-dinorpregna-2,5(10)-dien

Following the procedure of Example 17, but substituting 13 - propyl - 17α,20 - dihydroxy - 3 - methoxy - 18, 19 - dinorpregna - 1,3,5(10) - triene for 13 - ethyl - 17α, 20 - dihydroxy - 3 - methoxy - 18,19 - dinorpregna - 1,3,5 (10)-triene there is obtained 13-propyl-17α,20-dihydroxy-3-methoxy-18,19-dinorpregna-2,5(10)-diene.

EXAMPLE 19

13-butyl-17α,20-dihydroxy-3-methoxy-18,19-dinorpregna-2,5(10)-diene

Following the procedure of Example 17, but substituting 13 - butyl - 17α,20 - dihydroxy - 3 - methoxy - 18, 19 - dinorpregna - 1,3,5(10) - triene for 13 - ethyl - 17α, 20 - dihydroxy - 3 - methoxy - 18,19 - dinorpregna - 1,3,5 (10) - triene there is obtained 13-butyl-17α,20-dihydroxy-3-methoxy-18,19-dinorpregna-2,5(10)-diene.

EXAMPLE 20

13-isobutyl-17α,20-dihydroxy-3-methoxy-18,19-dinorpregna-2,5(10)-diene

Following the procedure of Example 17, but substituting 13 - isobutyl - 17α,20 - dihydroxy - 3 - methoxy - 18, 19 - dinorpregna - 1,3,5(10) - triene for 13 - ethyl - 17α, 20 - dihydroxy - 3 - methoxy - 18,19 - dinorpregna - 1,3,5 (10)-triene there is obtained 13-isobutyl-17α,20-dihydroxy-3-methoxy-18,19-dinorpregna-2,5(10)-diene.

EXAMPLE 21

13-ethyl-17α,20ξ-dihydroxy-18,19-dinorpregn-4-en-3-one

A solution consisting of 4.20 gm. of 13-ethyl-17α,20-dihydroxy - 3 - methoxy - 18,19 - dinorpregna - 2,5(10)-diene, in 117 ml. of methanol, 7.8 ml. of concentrated hydrochloric acid and 5.2 ml. of water is stirred under nitrogen for 1 hour at room temperature. Filtering yielded 0.31 g. of colorless solid, M.P. 158–168°. The filtrate is diluted with benzene, washed with saturated aqueous sodium bicarbonate, water, dried over anhydrous sodium sulfate and the solvent is evaporated in vacuo giving 3.50 g. of a gum. The gum is columned on Grade III Woelm neutral alumina and eluted with benzene containing increasing proportions of ether and recrystallization from methanol to yield 0.44 gm. of 13-ethyl-17α,20-dihydroxy-18,19-dinorpregna-4-en-3-one, M.P. 150–152°;

$\lambda_{max.}^{KBr}$ 2.98, 6.20μ; $\lambda_{max.}^{EtOH}$ 244 mμ (ε 16,500)

*Analysis.*—Calcd. for $C_{21}H_{32}O_3$: C, 75.86; H, 9.70. Found: C, 75.30; H, 10.10.

Further elution of the column with increasing proportions of ether and recrystallization from methanol and from isopropanol yielded 0.19 gm. of the corresponding 20-epimer, M.P. 181–185°;

$\lambda_{max.}^{KBr}$ 3.00, 6.02, 6.23μ; $\lambda_{max.}^{EtOH}$ 243 mμ (ε 15,500)

*Analysis.*—Calcd. for $C_{21}H_{32}O_3$: C, 75.86; H, 9.70. Found: C, 75.68; H, 9.27.

EXAMPLE 22

13-propyl-17α,20ξ-dihydroxy-18,19-dinorpregn-4-en-3-one

Following the procedure of Example 21, but substituting 13 - propyl - 17α,20 - dihydroxy - 3 - methoxy - 18, 19 - dinorpregna - 2,5(10) - diene for 13 - ethyl - 17α,20-dihydroxy - 3 - methoxy - 18,19 - dinorpregna - 2,5(10)-diene there is obtained 13-propyl-17α,20ξ-dihydroxy-18,19-dinorpregn-4-en-3-one.

EXAMPLE 23

13-butyl-17α,20ξ-dihydroxy-18,19-dinorpregn-4-en-3-one

Following the procedure of Example 21, but substituting 13 - butyl - 17α,20 - dihydroxy - 3 - methoxy - 18, 19 - dinorpregna - 2,5(10) - diene for 13 - ethyl - 17α,20-dihydroxy - 3 - methoxy - 18,19 - dinorpregna - 2,5(10)-diene there is obtained 13-butyl-17α,20ξ-dihydroxy-18,19-dinorpregn-4-en-3-one.

EXAMPLE 24

13-isobutyl-17α,20ξ-dihydroxy-18,19-dinorpregn-4-en-3-one

Following the procedure of Example 21, but substituting 13 - isobutyl - 17α,20 - dihydroxy - 3 - methoxy - 18, 19 - dinorpregna - 2,5(10) - diene for 13 - ethyl - 17α,20-dihydroxy - 3 - methoxy - 18,19 - dinorpregna - 2,5(10)-diene there is obtained 13-isobutyl-17α,20-dihydroxy-18,19-dinorpregn-4-en-3-one.

EXAMPLE 25

13-ethyl-3-methoxy-20-cycloethylenedioxy-18,19-dinorpregna-1,3,5(10)-trien-17α-ol A solution of 1.0 gm. of 13-ethyl-3-methoxy-18,19-dinorpregna - 1,3,5(10) - trien - 17α - ol - 20 - one in 30 ml. of ethylene glycol and 300 ml. of benzene is refluxed 18 hours using a Dean-Stark water take off. The ethylene glycol layer is separated and the benzene layer is washed with saturated aqueous sodium bicarbonate, water and evaporated in vacuo. The solid residue is recrystallized from hexane to yield 0.85 gm. of 13-ethyl-3-methoxy-20 - cycloethylenedioxy - 18,19 - dinorpregna - 1,3,5(10)-trien-17α-ol having a melting point of 95–99° C.; $\lambda_{max}$ 2.86, 9.25, 9.64μ.

*Analysis.*—Calcd. for $C_{24}H_{34}O_4$: C, 74.57; H, 8.87. Found: C, 74.39; H, 9.09.

EXAMPLE 26

13-propyl-3-methoxy-20-cycloethylenedioxy-18,19-dinorpregna-1,3,5(10)-trien-17α-ol Following the procedure of Example 25, but substituting 13 - propyl - 3 - methoxy - 18,19 - dinorpregna - 1, 3,5(10) - trien - 17α - ol - 20 - one for 13 - ethyl - 3-methoxy - 18,19 - dinorpregna - 1,3,5(10) - trien - 17α - ol-20-one, there is obtained 13-propyl-3-methoxy-20-cycloethylenedioxy-18,19-dinorpregna-1,3,5(10)-trien-17α-ol.

EXAMPLE 27

13-butyl-3-methoxy-20-cycloethylenedioxy-18,19-dinorpregna-1,3,5(10)-trien-17α-ol Following the procedure of Example 25, but substituting 13 - butyl - 3 - methoxy - 18,19 - dinorpregna - 1,3,5 (10) - trien - 17α - ol - 20 - one for 13 - ethyl - 3- methoxy-18,19 - dinorpregna - 1,3,5(10) - trien - 17α - ol - 20 - one, there is obtained 13 - butyl - 3 - methoxy - 20 - cycloethylenedioxy - 18,19 - dinorpregna - 1,3,5(10) - trien-17α-ol.

EXAMPLE 28

13-isobutyl-3-methoxy-20-cycloethylenedioxy-18,19-dinorpregna-1,3,5(10)-trien-17α-ol Following the procedure of Example 25, but substituting 13 - isobutyl - 3 - methoxy - 18,19 - dinorpregna-1,3,5(10) - trien - 17α - ol - 20 - one for 13 - ethyl - 3-methoxy - 18,19 - dinorpregna - 1,3,5(10) - trien - 17α - ol-20-one there is obtained 13-isobutyl-3-methoxy-20-cycloethylenedioxy-18,19-dinorpregna-1,3,5(10)-trien-17α-ol.

EXAMPLE 29

13-ethyl-17α-hydroxy-18,19-dinorpregn-4-en-3,20-dione

A solution of 1.0 gm. of 13-ethyl-3-methoxy-20-cycloethylenedioxy - 18,19 - dinorpregna - 1,3,5(10) - trien-17α-ol in distilled tetrahydrofuran (100 ml.) is added to 250 ml. of distilled liquid ammonia over a 10 minute period. Immediately, 0.90 gm. of lithium in small pieces is added as rapidly as possible with stirring. Vigorous stirring of the blue solution is continued for 2 hours. Absolute ethanol is then added dropwise to discharge the blue color. Hot water is added and the mixture is extracted with ether. The organic extracts are washed with saturated aqueous sodium bicarbonate, brine, dried over anhydrous sodium sulfate and the solvent is evaporated in vacuo to yield 1.10 gm. of 13 - ethyl - 3 - methoxy - 20 - cycloethylenedioxy-18,19 - dinorpregna - 2,5(10) - diene - 17α - ol, $\lambda_{max}$ 5.89, 5.99μ.

1.0 gm. of the resulting product is heated at 60° in a mixture of 40 ml. of methanol, 22.5 ml. of water and 7.5 ml. of concentrated hydrochloric acid for 20 minutes. The mixture is cooled to room temperature, diluted with ether, washed with water, saturated aqueous sodium bicarbonate, water, dried over anhydrous sodium sulfate and the solvent is evaporated in vacuo. The resulting solid residue is recrystallized from ethyl acetate/hexane to yield 0.45 gm. of 13-ethyl-17α-hydroxy-18,19-dinorpregn-4-en-3,20-dione M.P. 204–206°.

EXAMPLE 30

13-propyl-17α-hydroxy-18,19-dinorpregn-4-en-3,20-dione

Following the procedure of Example 29, but substituting 13 - propyl - 3 - methoxy - 20 - cycloethylenedioxy - 18,19 - dinorpregn - 1,3,5(10) - trien - 17α - ol for 13 - ethyl - 3 - methoxy - 20 - cycloethylenedioxy - 18,19-dinorpregn-1,3,5(10)-trien-17α-ol there is obtained 13-propyl-17α-hydroxy-18,19-dinorpregn-4-en-,3,20-dione.

EXAMPLE 31

13-butyl-17α-hydroxy-18,19-dinorpregn-4-en-3,20-dione

Following the procedure of Example 29, but substituting 13 - butyl - 3 - methoxy - 20 - cycloethylenedioxy-18,19 - dinorpregna - 1,3,5(10) - trien - 17α - ol for 13-ethyl - 3 - methoxy - 20 - cycloethylenedioxy - 18,19 - dinorpregna-1,3,5(10)-trien-17α-ol there is obtained 13-butyl-17α-hydroxy-18,19-dinorpregn-4-en-3,20-dione.

EXAMPLE 32

13-isobutyl-17α-hydroxy-18,19-dinorpregn-4-en-3,20-dione

Following the procedure of Example 29, but substituting 13 - isobutyl - 3 - methoxy - 20 - cycloethylenedioxy-18,19-dinorpregna-1,3,5(10)-trien-17α-ol for 13-ethyl-3-methoxy - 20 - cycloethylenedioxy - 18,19 - dinorpregna-1,3,5(10)-trien-17α-ol there is obtained 13-isobutyl-17α-hydroxy-18,19-dinorpregn-4-en-3,20-dione.

EXAMPLE 33

13-ethyl-17α-hydroxy-18,19-dinorpregn-4-en-3,20-dione, 17-acetate

To a solution of 0.50 gm. of 13-ethyl-17α-hydroxy-18,19-dinorpregn-4-en-3,20-dione in 4.0 ml. of acetyl chloride is added 8.0 ml. of acetic anhydride then 0.40 ml. of pyridine dropwise with rapid stirring. The slurry is warmed to achieve complete solution, then cooled to room temperature and stirred at room temperature for 65 hours. The solvents are evaporated in vacuo giving a yellow solid residue. The crude product is dissolved in 10.0 ml. of tetrahydrofuran and 10.0 ml. of methanol and then 10.0 ml. of methanolic potassium hydroxide is added at 0° C. under nitrogen. Stirring under nitrogen at 0° C. is continued for 1 hour. The mixture is poured into aqueous sodium bicarbonate, diluted with ether, the organic layer washed with water, dried over anhydrous sodium sulfate and the solvent is evaporated in vacuo. The residue crystallized on trituration with ether. Rapid column chromatography on neutral alumina with 100% benzene and recrystallization from hexane/ethyl acetate yields 0.205 gm. of 13-ethyl-17α-hydroxy-18,19-dinorpregn-4-en-3,20-dione, 17-acetate; M.P. 186–189°;

$\lambda_{max}^{KBr}$ 5.77, 5.83, 5.99, 6.20μ; $\lambda_{max}^{EtOH}$ 239 mμ (ε 16,100)

*Analysis.*—Calcd. for $C_{23}H_{32}O_4$: C, 74.16; H, 8.66. Found: C, 74.25; H, 8.66.

EXAMPLE 34

13-propyl-17α-hydroxy-18,19-dinorpregn-4-en-3,20-dione, 17-acetate

Following the procedure of Example 33, but substituting 13 - propyl - 17α - hydroxy - 18,19 - dinorpregn - 4-en-3,20-dione for 13-ethyl-17α-hydroxy-18,19-dinorpregn 4-en-3,20-dione, there is obtained 13-propyl-17α-hydroxy-18,19-dinorpregn-4-en-3-20-dione, 17-acetate.

EXAMPLE 35

13-butyl-17α-hydroxy-18,19-dinopregn-4-en-3,20-dione, 17-acetate

Following the procedure of Example 33, but substituting 13 - butyl - 17α - hydroxy - 18,19 - dinorpregn-4-en-3,20-dione for 13-ethyl-17α-hydroxy-18,19-dinorpregn-4-en-3,20-dione for 13-ethyl-17 -hydroxy-18,19-dinorpregn-18,19-dinorpregn-4-en-3,20-dione, 17-acetate.

EXAMPLE 36

13-isobutyl-17α-hydroxy-18,19-dinorpregn-4-en-3,20-dione, 17-acetate

Following the procedure of Example 33, but substituting 13 - isobutyl - 17α - hydroxy - 18,19 - dinorpregn - 4 en-3,20-dione for 13-ethyl-17α-hydroxy-18,19-dinorpregn-4-en-3,20-dione, there is obtained 13-isobutyl-17α-hydroxy-18,19-dinorpregn-4-en-3,20-dione, 17-acetate.

It is understood that either the *dl*-steroids or the specific *d*- or *l*-isomers may be employed as starting materials with like results.

The invention may be variously otherwise embodied within the scope of the appended claims.

What is claimed is:

1. A compound having the structural formula

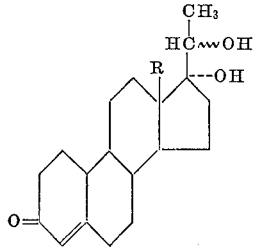

wherein R is as hereinbefore defined.

2. A compound according to claim 1 that is 13-ethyl-17α,20α-dihydroxy-18,19-dinorpregn-4-en-3-one.

3. A compound according to claim 1 that is 13-ethyl-17α,20α-dihydroxy-18,19-dinorpregn-4-en-3-one.

References Cited

UNITED STATES PATENTS 3,372,175  3/1968  Fried _____ 260—397.4
3,381,003  4/1968  Patchett et al. _____ 260—239.55

ELBERT L. ROBERTS, Primary Examiner

U.S. Cl. X.R.

260—239.55, 397.5, 999

PO-1050
(5/69)

UNITED STATES PATENT OFFICE
CERTIFICATE OF CORRECTION

Patent No. 3,488,364          Dated January 6, 1970

Inventor(s) Daniel M. Teller, George H. Douglas and Herchel Smit

It is certified that error appears in the above-identified patent and that said Letters Patent are hereby corrected as shown below:

Claim 3 should read:

3. A compound according to claim 1 that is 13-ethyl-17α,20β-dihydroxy-18,19-dinorpregn-4-en-3-one.

SIGNED AND
SEALED
JUN 23 1970

(SEAL)
Attest:

Edward M. Fletcher, Jr.          WILLIAM E. SCHUYLER, JR.
Attesting Officer                 Commissioner of Patents